(12) United States Patent
Bauer et al.

(10) Patent No.: US 9,457,430 B2
(45) Date of Patent: Oct. 4, 2016

(54) PROTECTIVE DEVICE FOR THE LASER MACHINING OF HOLES IN COMPONENTS

(75) Inventors: Thorsten Bauer, Memmelsdorf (DE); Ulrich Graf, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 14/235,196

(22) PCT Filed: Jun. 21, 2012

(86) PCT No.: PCT/EP2012/062019
§ 371 (c)(1),
(2), (4) Date: Apr. 22, 2014

(87) PCT Pub. No.: WO2013/013909
PCT Pub. Date: Jan. 31, 2013

(65) Prior Publication Data
US 2014/0224779 A1    Aug. 14, 2014

(30) Foreign Application Priority Data

Jul. 26, 2011  (DE) .................. 10 2011 079 815

(51) Int. Cl.
*B23K 26/00* (2014.01)
*B23K 26/38* (2014.01)
(Continued)

(52) U.S. Cl.
CPC .......... *B23K 26/38* (2013.01); *B23K 26/389* (2015.10); *C08K 7/06* (2013.01); *C08K 7/14* (2013.01); *F02M 61/168* (2013.01); *F02M 2200/8069* (2013.01); *Y10T 428/24994* (2015.04)

(58) Field of Classification Search
CPC ...... B23K 26/38; B23K 26/389; C08K 7/06; C08K 7/14; F02M 61/168; F02M 2200/8069; Y10T 428/24994

USPC .......................................... 219/121.7, 121.71
See application file for complete search history.

(56) References Cited

U.S. PATENT DOCUMENTS

| 5,345,057 A * | 9/1994 | Muller ................ B23K 26/142 219/121.71 |
| 6,070,813 A * | 6/2000 | Durheim ............... B23K 26/18 239/533.2 |

(Continued)

FOREIGN PATENT DOCUMENTS

| DE | 19908630 | 8/2000 |
| DE | 202004009931 | 9/2004 |

(Continued)

OTHER PUBLICATIONS

International Search Report for Application No. PCT/EP2012/062019 dated Oct. 24, 2012 (3 pages).

*Primary Examiner* — Justin Jonaitis
(74) *Attorney, Agent, or Firm* — Michael Best & Friedrich LLP

(57) ABSTRACT

The invention relates to a protective device (1) for the laser machining of holes (3) in at least one component (2) by means of a laser beam (5), wherein the protective device (1) is positionable in the beam direction downstream of the beam-exit-side end (8) of a hole (3) to be machined in the component wall (10), in order to protect an adjoining rear space having a component wall (11), opposite the hole (3), of the component (2) from the incident laser beam. The protective device (1) according to the invention is formed from a composite made of a matrix composed of polyether ether ketone plastics material and fibers embedded therein, wherein the fibers are embedded such that, with respect to their particular fiber extending direction, they extend in a criss-cross manner in the plastics material and are distributed at approximately the same density in the volume of the plastics material of the protective device (1). The fibers are configured as glass fibers or carbon fibers in order to split the laser beam (5) passing into the composite and to reduce the energy density thereof.

23 Claims, 2 Drawing Sheets

(51) Int. Cl.
*F02M 61/16* (2006.01)
*C08K 7/06* (2006.01)
*C08K 7/14* (2006.01)

(56) References Cited

U.S. PATENT DOCUMENTS

| | | | |
|---|---|---|---|
| 6,407,362 B1 * | 6/2002 | Schmid | B23K 26/06 |
| | | | 219/121.7 |
| 8,242,408 B2 * | 8/2012 | Hu | B23K 26/18 |
| | | | 219/121.71 |
| 2006/0086700 A1 * | 4/2006 | Callies | B23K 26/123 |
| | | | 219/121.59 |
| 2007/0175872 A1 * | 8/2007 | Rhoades | B23K 26/18 |
| | | | 219/121.73 |

FOREIGN PATENT DOCUMENTS

| | | |
|---|---|---|
| EP | 0768140 | 4/1997 |
| EP | 1160004 | 12/2001 |
| EP | 1661658 | 5/2006 |
| JP | 2003045079 | 2/2003 |
| JP | 2004090628 | 3/2004 |
| JP | 2007307913 | 11/2007 |
| JP | 2009233714 | 10/2009 |
| JP | 2011098356 | 5/2011 |
| WO | 9949501 | 9/1999 |
| WO | 2009023278 | 2/2009 |

* cited by examiner

PROTECTIVE DEVICE FOR THE LASER MACHINING OF HOLES IN COMPONENTS

BACKGROUND OF THE INVENTION

The invention is based on a protective device for the laser machining of holes in at least one component by means of laser radiation, the protective device being positionable at the beam-exit-side end of a hole to be machined, in order to protect an adjoining rear space of the component from the laser radiation, of the generic type. The invention is also based on a method for producing a component such as a nozzle, in particular an injector, by using the protective device according to the invention and on a method for producing an injector by using the protective device according to the invention.

In the industrial machining of materials, in particular for the drilling of holes, such as for example through-holes or blind holes, in components or workpieces, pulsed high-power lasers are being used increasingly often, the use of which allows a higher level of precision of the machining and a shorter machining time to be achieved in comparison with conventional mechanical machining techniques. A problem with the laser drilling of holes is that the laser beam emerging from the rear side of the drilled hole upon completion of the laser drilling operation when drilling a hole has to be shielded or blocked in order to protect the component wall lying opposite the rear side of the drilled hole from undesired damage by the laser beam. This problem arises in particular whenever the components to be machined by means of laser radiation are, for example, injection nozzles or diesel nozzles or the like for use in automotive engineering. Such an injection nozzle has a substantially hollow-cylindrical nozzle body with a nozzle cap, in the cap wall of which multiple spray holes are to be provided or drilled out in order to distribute or atomize the fuel through these spray holes into the combustion chamber of the engine during the later use of the nozzle as intended. Since such injection nozzles are formed rotationally symmetrically with respect to their longitudinal axis, it is common practice in the prior art for the laser drilling of a spray hole in the nozzle cap to insert within the cavity that is formed in the nozzle cap for the machining time of the laser drilling a protective device which is formed from metallic or ceramic material, is also referred to as so-called backing material and serves the purpose of blocking or absorbing the laser beam emerging from the drilled hole that has been drilled by the laser in the wall of the nozzle cap at the rear side of the drilled hole, in order to prevent damage to the opposite wall of the nozzle cap.

A disadvantage of such protective devices according to the prior art is that the metallic or ceramic materials used for them cannot withstand the laser radiation emerging from the rear side of the drilled hole and impinging on the protective device in the case of laser machining by high-power lasers with ultrashort laser pulses, and consequently cannot perform their protective function. In this respect, FIG. 2 shows a conventional protective device 1, which when used as intended in the cavity 6 of a diesel nozzle 2 has through-holes 7 caused by a laser beam emerging from the rear side of the drilled hole, and consequently no longer has any protective function for the rear space. FIG. 3 shows by way of example a diesel nozzle 2 after failure of the conventional protective device 1, the left-hand wall of the nozzle body having a drilled spray hole 3 drilled out by means of laser radiation and the right-hand wall, which lies opposite the rear side of the drilled spray hole, displaying damage 13 in the form of a penetration by the laser beam, in spite of a protective device 1 having been inserted during the laser machining, as a result of the failure of the protective device 1 from FIG. 2.

SUMMARY OF THE INVENTION

The protective device of the invention has the advantage that the laser radiation that emerges on the exit side of the drilled hole of a component or workpiece to be machined is absorbed as a result of the composite structure according to the invention of the protective device arranged downstream of the exit side of the drilled hole in the direction of the laser beam when used as intended, so that the wall of the component opposite the exit side of the drilled hole is protected from unwanted damage by a laser beam otherwise continuing to propagate unhindered. This is so because, since the composite structure of the protective device according to the invention is formed by fibers embedded in a polymer matrix, the laser beam penetrating into the protective device is split by the fibers distributed in the polymer matrix, the energy density of the laser beam being attenuated or reduced, and absorbed, as a difference from conventional protective devices made of metal or ceramic, in the case of which the penetrating laser beam does not undergo any such splitting and consequently can penetrate such a conventional protective device.

The protective device according to the invention is particularly suitable in an advantageous way for components that have a rotationally symmetrical form with a cavity formed therein, that is to say such as for example for injection nozzles, diesel nozzles, restrictors, valve elements and filter elements.

Further advantageous developments and refinements of the invention are provided by the measures recited in the subclaims. In particular, a particularly high piercing resistance of the protective device according to the invention can be achieved if a polymer matrix of thermoplastic polyether ether ketone (PEEK) and glass fibers embedded therein is used, a protective device formed in this way being capable of being produced at low cost as a result of allowing itself to be produced in a simple manner by injection molding. On account of the high piercing resistance of the protective device according to the invention, as a difference from the prior art a higher level of reliability of the process is obtained during the laser machining, and consequently a lower reject rate due to damaged components.

BRIEF DESCRIPTION OF THE DRAWINGS

An exemplary embodiment of the invention is explained in more detail in the following description and in the accompanying drawings, in the schematic views of which.

DETAILED DESCRIPTION

Figure 1:
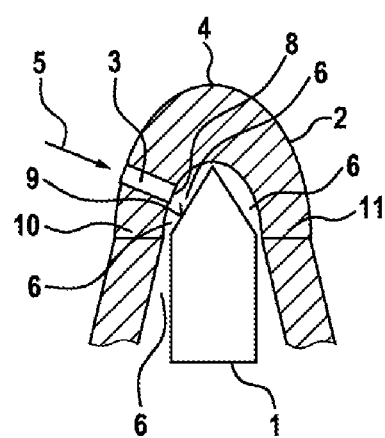
FIG. 1 shows a longitudinal sectional view of a diesel nozzle with a protective device according to the invention positioned in a cap of the diesel nozzle and comprising a composite of polyether ether ketone polymer with glass fibers embedded therein.

FIG. 1 shows in a highly schematic view the protective device 1 according to the invention, which is inserted in a component 2 to be machined by means of a laser beam 5 during the laser machining. The component 2 to be machined is the top part of a diesel nozzle, which is represented in a machining stage in which the laser beam 5 from a high-power laser operated in a pulsed manner (not represented) produces a spray hole 3 in the left-hand wall 10 of the nozzle cap 4 forming the top part of the diesel nozzle 2. Since, on account of the cavity 6 formed within the nozzle 2, the right-hand wall 11, lying opposite the spray hole 3, has to be protected from the laser radiation emerging from the spray hole 3, the protective device 1 is inserted in the cavity 6 of the nozzle 2 downstream of the exit side 8 of the drilled hole in the direction of the beam, in order to completely absorb the laser radiation emerging from the exit side 8 of the drilled hole.

Figure 2:
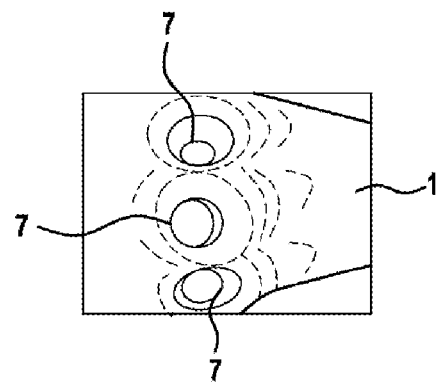
FIG. 2 shows a detail of a conventional protective device made of metal in a plan view, the protective device serving when used as intended in a component to be machined for shielding from laser radiation and having multiple penetrations lying next to one another, caused by laser radiation with ultrashort laser pulses in the nanosecond range.
Figure 3:
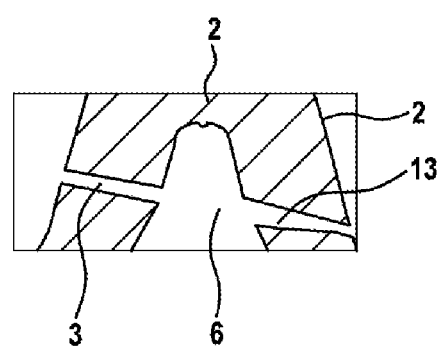
FIG. 3 shows a partial view of the top end of a diesel nozzle in longitudinal section, in which a spray hole has been drilled out on the left side by means of ultrashort laser pulses from a laser source and a side of the diesel nozzle opposite the spray hole displays damage caused by the laser beam, as a result of the failure of the conventional protective device from FIG. 2 during the laser machining.

According to the invention, it is provided for this purpose that the protective device 1 is formed by a composite of thermoplastic polyether ether ketone polymer (PEEK) and glass fibers embedded substantially uniformly therein. In the exemplary embodiment, the glass fibers are arranged in a disorderly or irregular manner with respect to their respective directions of fiber extent, i.e. criss-crossing one another in the volume of a polymer matrix of polyether ether ketone. If a pulsed high-power laser with a peak pulse power of typically approximately 25 MW is used as the radiation source in the infrared wavelength range around approximately 1 μm with ultrashort pulses in the sub-nanosecond to picosecond range, the laser radiation that emerges at the rear side 8 of the drilled hole 3 after drilling out the predefined drilled hole 3 in the diesel nozzle wall impinges on the surface 9 adjoining the rear side 8 of the drilled hole of the protective device 1, which has been inserted into the cavity 6. The laser beam 5 impinging on the surface 9 of the protective device 1 penetrates into the composite of polyether ether ketone polymer (PEEK) and glass fibers and undergoes a splitting due to the glass fibers arranged with approximately uniform density in the PEEK polymer matrix, the energy density of the laser beam 5 successively falling as a result of the splitting, and the laser beam being absorbed in the composite material. In comparison with a protective device in which the backing material is merely "monolithically" formed, as in the case of the prior art according to FIG. 2, i.e. consists of metal or ceramic, and as a result there is in this backing material merely a local absorption of the laser beam which, as seen transversely in relation to the direction of beam propagation, is limited substantially to the beam diameter of the laser beam penetrating into the backing material, the locally high energy density thereof leading to a removal of material along the direction of beam propagation of the laser beam in the material, by contrast a laser beam penetrating into the protective device 1 according to the invention undergoes a volume absorption, since the laser beam penetrating into the material of a "hybrid" form of the protective device 1 according to the invention is split, or fanned out, by the substantially "amorphous" arrangement of the fibers in the volume of the polymer, so that the energy density is reduced as a result of the zone of interaction of the laser beam in the composite material increasing diffusely due to the fanning out, and the absorption takes place as heat dissipation within the volume of the material. Accordingly, the protective device 1 according to the invention, formed as a composite, has in comparison with the prior art a significantly higher level of absorption for the laser radiation occurring.

In order to split the laser beam 5 penetrating into the composite material of the protective device 1 according to the invention by means of the glass fibers embedded therein optimally into part-beams, the density and size of the glass fibers in the PEEK must be chosen such that the impinging laser beam is optimally diffused and the backing material withstands the machining of a nozzle. For this purpose, the mixing ratio or the filling quantity of the fibers in the composite is fixed at a range of 40-60% for the fiber fraction, in order with this density of the fibers in the composite to form a relatively good diffuser for the impinging laser radiation. Since the beam diameter of the laser source to be used for the laser drilling in the exemplary embodiment is approximately 20-25 μm, the diameter of the fibers is fixed at a range of 10-15 μm. With significantly higher fiber diameters, a decrease in the probability of diffusion processes in favor of an increase in coupling-in processes must be expected for the incident laser radiation, potentially leading to an undesired destruction of the fibers on account of the high energy density of the laser radiation. In order also to achieve a stochastic mixing of the fibers in the composite, with no predominant direction of preferential orientation of the fibers in the PEEK matrix being established, the length thereof is fixed to a range of 0.1-0.5 mm. These particulars for the protective device continue to apply if, instead of the wavelength used, in the infrared wavelength range of 1030-1064 nm of the laser used for the machining, alternatively lasers of which the emission wavelength lies at 531 nm or else at 1500 nm are used. In a variant of the embodiment of the invention, the fibers embedded in the composite structure are formed as carbon fibers.

The front portion of the protective device 1, which is facing the nozzle cap 4 when the protective device 1 is positioned as intended within the cavity 6 of the diesel nozzle 2, is formed as tapering to a point, so that between the wall 10, intended for the laser drilling, of the nozzle cap region of the diesel nozzle 2 and the surface 9, neighboring said wall, of the protective device 1 there remains an intermediate space, the function of which is to allow a working and shielding gas, such as for example N2 or a noble gas such as helium, to flow through the intermediate space, in order to discharge residues of material that have evaporated or melted off during the laser machining of the component 2 from the drilled hole 3 by way of the rear side 8 thereof. A further function of the surface 9 is that it offers the laser beam 5 emerging from the rear side of the drilled hole 3 a defined planar boundary surface that runs approximately at right angles to the incident laser beam 5.

To sum up, the protective device 1 according to the invention is formed by a composite of a matrix of polyether ether ketone polymer and fibers embedded therein, the fibers being embedded such that they criss-cross one another with respect to their respective direction of fiber extent in the polymer and are distributed with approximately uniform density in the volume of the polymer of the protective device 1. The fibers take the form of glass fibers or carbon fibers for splitting the laser beam 5 penetrating into the composite and reducing the energy density thereof. The protective device 1 according to the invention is suitable for the production of components such as nozzles or injectors that have a rotationally symmetrical form, the protective device according to the invention being positioned in the component such that, in the beam direction of the laser beam used for the machining, the protective device blocks the laser radiation emerging downstream of the exit side of the drilled hole in the component and shields an opposite wall of the component.

The invention claimed is:

1. A protective device (1) for the laser machining of holes (3) in at least one component (2) by means of laser radiation (5), the protective device (1) being positionable at a beam-exit-side end (8) of a hole (3) to be machined, in order to protect an adjoining rear space of the component (2) from the laser radiation, characterized in that the protective device (1) is formed by a composite of polymer and fibers embedded therein.

2. The protective device as claimed in claim 1, characterized in that the polymer used in the composite of the protective device (1) is of a thermoplastic form.

3. The protective device as claimed in claim 1, characterized in that the polymer used in the composite of the protective device (1) is polyether ether ketone polymer.

4. The protective device as claimed in claim 1, characterized in that the fibers used in the composite are arranged such that they criss-cross one another with respect to their respective directions of fiber extent in the polymer.

5. The protective device as claimed in claim 1, characterized in that the fibers are arranged such that they are distributed with approximately uniform density in a volume of the polymer of the protective device (1).

6. The protective device as claimed in claim 5, characterized in that, for a fraction of fibers in the composite, a filling quantity lies within a range of approximately 40% to 60%.

7. The protective device as claimed in claim 5, characterized in that the fibers have a diameter in the range of approximately 10 to 15 µm.

8. The protective device as claimed in claim 5, characterized in that the fibers have a length of approximately 0.1 to 0.5 mm.

9. The protective device as claimed in claim 1, characterized in that the fibers are formed as glass fibers in the composite of the protective device (1).

10. The protective device as claimed in claim 9, characterized in that the glass fibers are designed such that they are almost transparent for the emission wavelength of the laser source used for the laser machining.

11. The protective device as claimed in claim 1, characterized in that the composite forming the protective device (1) can be produced by means of injection molding.

12. A method for producing a component by using the protective device as claimed in claim 1, the protective device (1) being positioned in a space of the component (2) such that the laser radiation emerging at a rear side of a drilled hole (3) provided in a wall (10) of the component (2) is completely blocked by the protective device (1) and a portion (11) of the component (2) lying opposite is shielded.

13. The method as claimed in claim 12 wherein the component is an injector or a nozzle.

14. The method as claimed in claim 12, characterized in that the polymer used in the composite is of a thermoplastic form.

15. The method as claimed in claim 12, characterized in that the polymer used in the composite is polyether ether ketone polymer.

16. The method as claimed in claim 1, characterized in that the fibers used in the composite are arranged such that they criss-cross one another with respect to their respective directions of fiber extent in the polymer.

17. The method as claimed in claim 12, characterized in that the fibers are arranged such that they are distributed with approximately uniform density in a volume of the polymer.

18. The method as claimed in claim 17, characterized in that, for a fraction of fibers in the composite, a filling quantity lies within a range of approximately 40% to 60%.

19. The method as claimed in claim 17, characterized in that the fibers have a diameter in the range of approximately 10 to 15 µm.

20. The method as claimed in claim 17, characterized in that the fibers have a length of approximately 0.1 to 0.5 mm.

21. The method as claimed in claim 12, characterized in that the fibers are formed as glass fibers in the composite.

22. The method as claimed in claim 21, characterized in that the glass fibers are designed such that they are almost transparent for the emission wavelength of the laser source used for the laser machining.

23. The method as claimed in claim 1, characterized in that the composite is produced by means of injection molding.

* * * * *